Nov. 15, 1960 R. W. BURTON 2,960,035
TARGET MISSILE
Filed Sept. 15, 1958 4 Sheets-Sheet 1

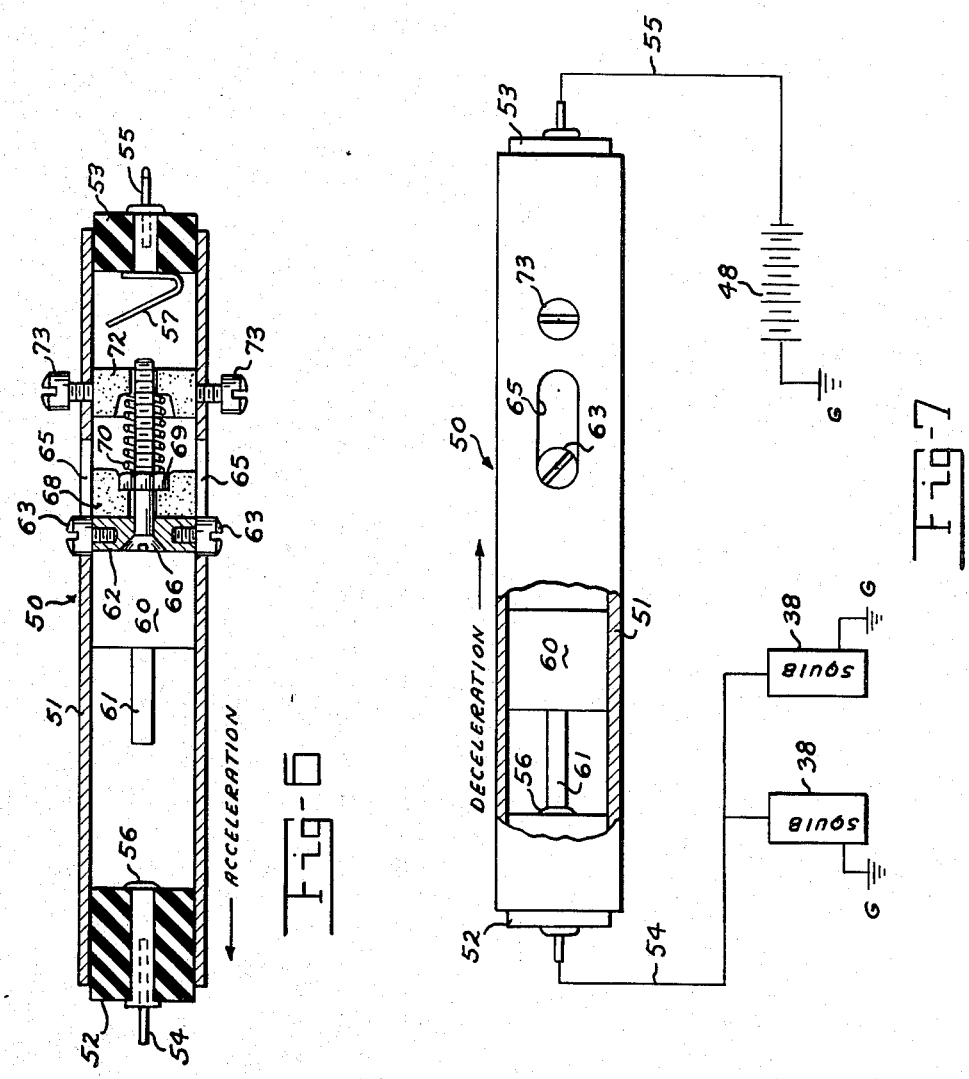

United States Patent Office 2,960,035
Patented Nov. 15, 1960

2,960,035

TARGET MISSILE

Robert W. Burton, 90 Lowell St., Andover, Mass.

Filed Sept. 15, 1958, Ser. No. 761,272

5 Claims. (Cl. 102—50)

(Granted under Title 35, U.S. Code (1952), sec. 266)

The invention described herein may be manufactured and used by or for the United States Government for governmental purposes without payment to me of any royalty thereon.

This invention relates to a high velocity target missile.

There is a decided need for a target missile capable of high supersonic speeds which can be used as a target to be fired on by aircraft or employed in testing target seeking apparatus.

The construction of target aircraft capable of speeds of the order of fifteen hundred miles per hour is prohibitively expensive due to the high power required and the complicated remote control guidance system necessary. There are readily available, however, high velocity aerial rockets capable of attaining high supersonic velocity.

In accordance with the present invention such a conventional rocket missile is easily and inexpensively modified by removing the warhead equipment from the nose section of the rocket and equipping the same with a pair of symmetrically disposed canard surfaces positioned forward of the center of gravity. The canard surfaces are rotatably mounted and normally maintained in alignment with the rocket longitudinal axis by a shear wire. Explosive squib actuated plungers are provided for acting on the canard surfaces to cut the shear wire and tilt the surfaces against a stop and relative wind pressure maintains the surfaces deflected.

The squibs are connected in an electric firing circuit controlled by an acceleration responsive switching means which becomes operative to fire the squibs only after the rocket has accelerated to maximum velocity and begins to decelerate. Due to the fact that the rocket has some spin velocity the plane of the canard surfaces at the instant the squibs are fired is purely random and the subsequent maneuver executed by the rocket is also purely random and may be a turn, a climb or dive, or combined maneuver. It is thus apparent that by using a high velocity rocket in quantity production modified in accordance with the invention it is possible to provide a target missile which does not require a complicated and expensive control system and which can execute a random high speed maneuver without the necessity of remote control.

For a clearer understanding of the invention reference should be made to the detailed description hereinafter given taken in conjunction with the appended drawings in which:

Fig. 5 is a view partly in section illustrating the mounting of the accelerometer control and power supply;

Fig. 6 is a plan view partly in section illustrating the details of the accelerometer control switch assembly; and Fig. 7 is a side elevation view, partly in section, of the device of Fig. 6 and including the firing circuit diagram.

Figure 1:
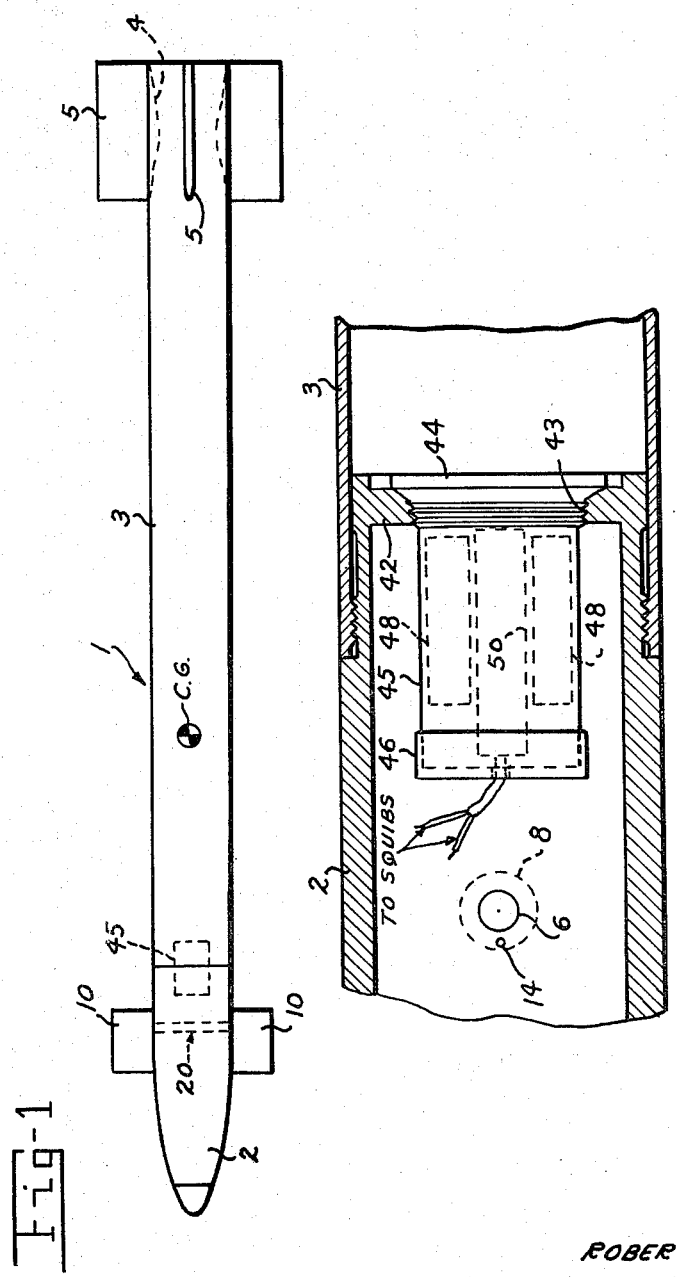
Fig. 1 is a top plan view of a conventional high speed rocket modified in accordance with the invention.

Referring now to Fig. 1, the reference numeral 1 generally indicates a well-known type of rocket missile which, for example, may be of the order of five inches in diameter and six feet long and capable of developing speeds of the order of 1500 feet per second. The missile 1 is provided with a hollow nose section 2 generally provided with an explosive charge and fuse which in the case of the invention are removed. The hollow nose section 2 is threaded onto the end of the tubular casing or main body 3 of the rocket 1. The casing 3 contains a charge of solid propellant fuel, not shown, which when ignited burns and expels the gases through a nozzle 4 to propel the rocket. The rocket body 3 has the usual stabilizing fins 5 secured thereon at its rear end.

The hollow nose section 2 is provided with control surfaces 10 commonly called canard surfaces since they are positioned forward of the missile center of gravity. The control surfaces 10 are coplanar and secured to a rock shaft generally indicated at 20 and rotatably journalled transversely in the hollow nose section 2. The vanes are normally in a plane passing through the missile longitudinal centerline and when deflected during flight of the missile provide an aerodynamic force acting forward of the missile's center of gravity to cause the missile to execute a maneuver. The vanes 10 are shown in Fig. 1 lying in the horizontal plane but they can as well lie in the vertical plane as will be explained later.

Figure 2:
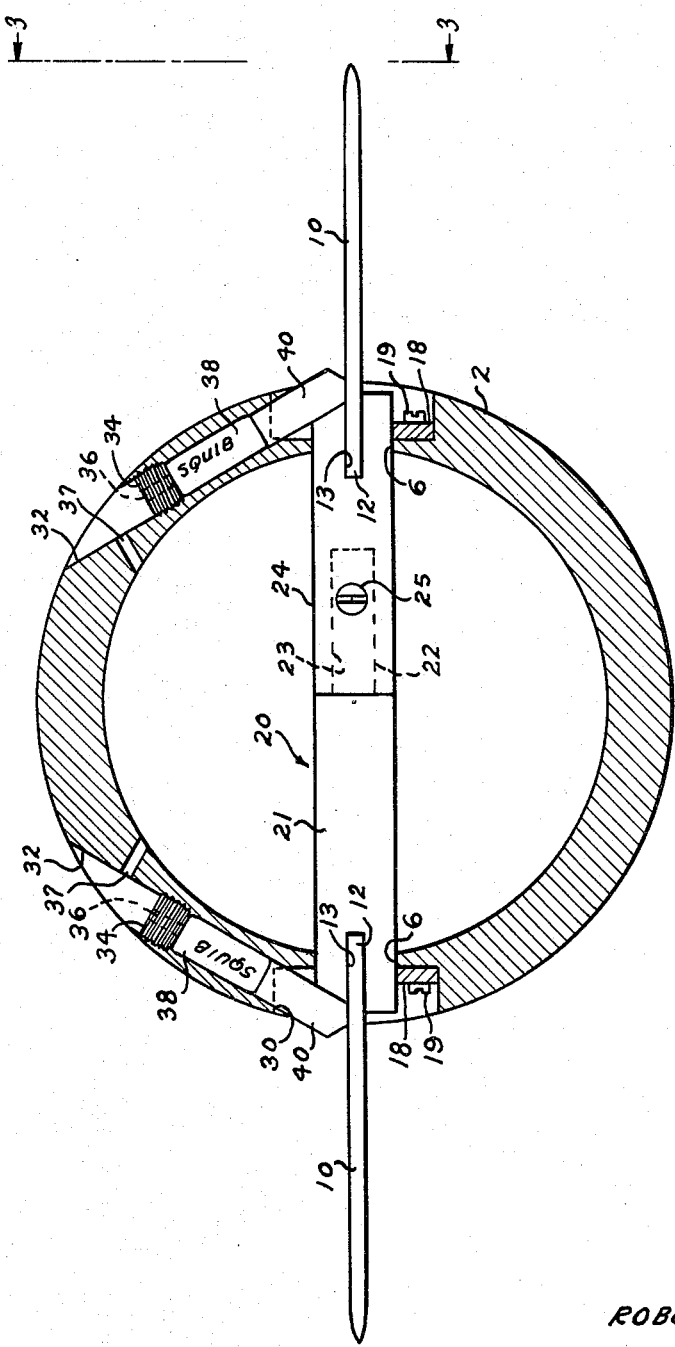
Fig. 2 is a rear view partly in section illustrating the mounting of the control surfaces and actuating means.
Figure 3:
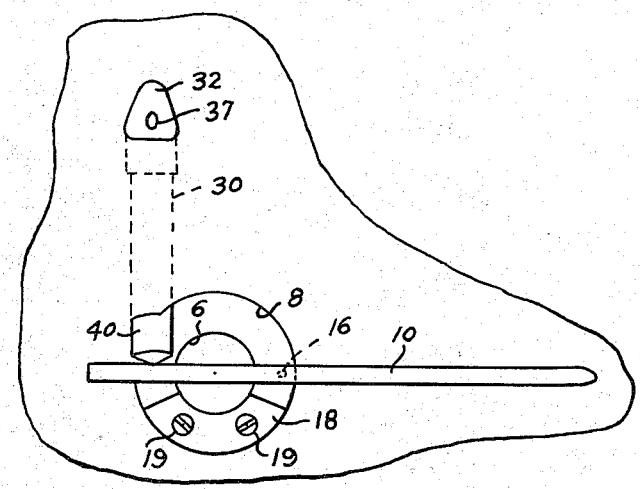
Fig. 3 is a fragmentary side elevation taken on line 3—3 of Fig. 2.
Figure 4:
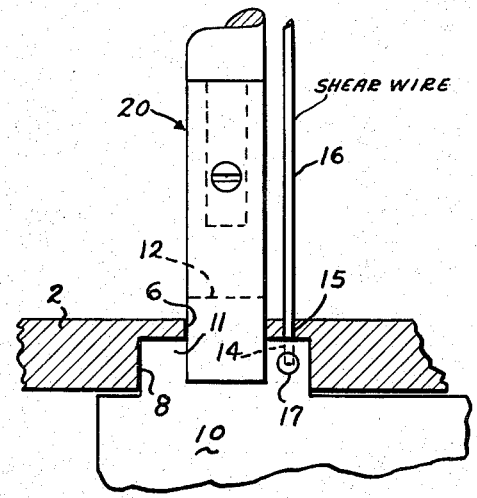
Fig. 4 is a top plan view partly in section illustrating the means for retaining the control vanes fixed by a shear wire.

Referring now to Figs. 2, 3 and 4, the hollow missile nose section has transverse bores 6 which serve as bearing journals for the shaft assembly generally indicated at 20. The bores 6 are each externally counterbored as at 8 to form external recesses into which the terminal ends of the shaft assembly 20 project.

Each of the vanes 10, see Fig. 4, have a projection 11 which extends into and is rotatable in a respective recess 8 in the nose section 2 and further provided with a tongue 12 which is brazed into a corresponding slot 13 in each end of the shaft assembly 20, note Fig. 2. Each vane extension 11 is drilled as at 14 to register with a corresponding drilled passage 15 in the wall of the nose section 2 and through which passes a transverse shear wire 16 which serves to normally fix the vanes 10 in a horizontal position and prevent their deflection due to aerodynamic forces. The drilled passage 14 in each vane extension 11 terminates in a hole 17 drilled through the vane 10 and into which the ends of the shear wire 16 project permitting the wire to be secured by soldering or upsetting. It will be apparent that if sufficient torque is applied to the vanes 10, the wire 16 will be sheared off and allow free rotation of vanes 10 and the shaft assembly 20. An arcuate stop 18 is secured by screws 19 in each recess 8, see Fig. 3, and is adapted to engage the extension 11 of each vane 10 and limit the rotation of the vanes and their connected shaft assembly 20. For example, the forward tip of each vane 10 as seen in Fig. 3 may deflect upward in the order of thirteen and one half degrees.

As seen in Figs. 2 and 4 the shaft assembly 20 is made in two separable parts. One part 21 is provided with a shouldered projection 22 which fits into a corresponding bore 23 in the other shaft part 24, the shaft parts 21 and 24 being retained in assembled relation by a screw 25 passing through the shaft section 24 and projection 22. This two-piece shaft construction permits each vane 10 to be brazed in the respective half shaft slot 13 as previously explained and allows each half shaft 21 and 24 to be passed through a bearing passage 6 in the nose section 2 and after telescoping the projection 22 into the bore 23 the shaft half sections are secured into a unitary assembly by inserting screw 25 through the open rear end of the nose section 2 when it is disassembled from the missile body 3.

With reference to Fig. 2 the side walls of the nose section 2 are each symmetrically drilled at an angle to form through passages 30 which are enlarged at their upper ends as at 32 and threaded to receive threaded plugs 34 which are centrally drilled as at 36 for passage of squib firing wires which can pass into the nose section through drilled passages 37. The drilled passages 30 each house a conventional electrically fired explosive squib 38 and a plunger 40, the latter being driven downward with considerable force by the explosion of the squibs. The plungers 40 have tapered ends which contact the vanes 10 to the rear of the center of rotation of shaft assembly 20, see Fig. 3, so that when the squibs are fired the plungers exert a considerable torque on the vanes 10 causing the shear wire 16 to be cut and deflecting the vanes 10 counterclockwise as seen in Fig. 3 until the vane extensions 11 strikes the stops 18. The vanes 10, being pivoted to the rear of their normal centers of pressure, will remain deflected due to the pressure of the relative wind acting thereon and will produce a powerful component of force acting normal to the longitudinal axis of the missile and forward of the center of gravity and effective to cause the missile to deviate from its normal flight path.

As seen in Fig. 5 the missile nose section 2 is provided with removable threaded connection to the tubular body section 3 and the nose section is provided with a rear wall 42 which is provided with a central threaded aperture 43 which receives an externally threaded removable plug 44. The plug 44 has a tubular metal housing 45 welded thereto which is closed at its outer end by a screw cap 46 which is suitably centrally apertured for the passage of squib firing wiring therethrough. The housing 45 contains a pair of batteries 48 capable of supplying sufficient current to fire the squibs 38 under the control of an acceleration responsive switching device generally indicated at 50.

As seen in Fig. 6 at a scale approximately twice full size the acceleration responsive switching device 50 comprises a cylindrical metal housing 51 made of nonmagnetic material such as brass closed at the ends by the insulating plugs 52 and 53. The plug 52 is provided with an output conductor 54 and is connected at one end to a central contact 56. The output lead 54 conducts current to fire the squibs 38, note Fig. 7. The plug 53 is provided with an input lead 55 which connects to a leaf spring contact 57. The input lead 55 is connected to the battery 48, one side of which is grounded to form a return circuit to the grounded sides of the squibs 38, see Fig. 7.

The tubular casing 51 contains a freely slidable plunger 60 made of nonmagnetic metal and provided with a cylindrical extension 61 adapted to engage the output contact 56. A disc 62 made of brass is slidable in the casing 51 and is guided by screws 63 the heads of which project into longitudinal slots 65 in the casing 51 and the disc 62 is adapted to be engaged by plunger 60 in one direction of its travel. The disc 62 is centrally apertured to receive a brass screw 66 which passes through a freely slidable cup shaped magnet 68 made of sintered high coercive strength magnetic material and the disc 62 and magnet 68 being clamped together by a nut 69 which also serves as an abutment for one end of a coil spring 70 concentric with the screw 66. The other end of the spring 70 seats in a cup shaped magnet 72 which is suitably centrally apertured to allow the screw 66 to pass freely therethrough. The magnet 72 is rigidly secured in the casing 51 by means of screws 73. The free end of the screw 66 forms an electrical contact which is adapted to engage the spring contact 57.

The operation of the acceleration responsive device 50, Figs. 6 and 7, is as follows: When the device 50 is subjected to a longitudinal acceleration in the direction indicated by the arrow in Fig. 6 plunger 60 will move to the right and abut the disc 62 as shown. The plunger 60, disc 62 and slidable magnet 68 together form a mass which under the force of acceleration reacts to compress the spring 70 which by suitable design will permit the magnets 68 and 72 to engage only when the acceleration equals or exceeds a value of 10 G. When the magnets 68 and 72 engage, however, the force of attraction is sufficient to keep the magnets in contact thereafter and overcoming the force of compression spring 70. When the magnets 68 and 72 engage the end of screw 66 will contact and remain in engagement with the spring contact 57 completing an electrical circuit from battery 48 and conductor 55 through screw 66 to the metal casing 51 to plunger 60 and the contact extension 61. The circuit to output contact 56 and output lead 54 will be broken as long as acceleration forces are present. When deceleration of the device 50 takes place as indicated by the arrow in Fig. 7 the plunger 60 will move to the left from the position as seen in Fig. 6 and the plunger extension will eventually engage the contact 56 as shown in Fig. 7 and a circuit will be completed from battery 48 to the squibs 38 causing the latter to explode.

In operation the target missile 1, in accordance with the invention, will be mounted in a rack (not shown) under the wing of an aircraft and when the desired altitude is reached will have its propellant ignited and the rocket missile released from its supporting rack. The target missile will then rapidly accelerate and when the acceleration reaches a predetermined value, for example, ten G's, the acceleration responsive device will close contact between the screw 66 and spring contact 57 in the manner previously described. The target missile 1, Fig. 1, will ultimately be accelerated to a maximum velocity of the order of 1500 feet per second and then due to high drag forces will begin to decelerate. When the deceleration reaches a small value such as one half G, the plunger 60, Figs. 6 and 7, will move to complete the firing circuit to the squibs 38, Fig. 7, in the manner previously described causing the same to explode.

When the squibs 38 explode the plungers 40, Figs. 2 and 3, will exert a large torque on the control vanes or canards 10 and will shear the shear wire 16, Fig. 4, in the manner previously explained. The vanes 10 will then be deflected until they engage stop 18, Fig. 3, and exert a control force on the target missile 1 to cause the same to execute a random maneuver in the manner previously explained. Rocket missiles of the type to which the invention pertains after launching rotate about their longitudinal axis and hence at the time the squibs 38 fire the orientation of the control vanes 10 cannot be predicted. The maneuver executed by the target missile will accordingly be truly random and may be a turn, climb or dive or combinations thereof. The area of the control vanes are such that forces in a turn will not exceed 2 G. The target missile can thus simulate a supersonic aircraft executing an evasive maneuver. After launching the target missile with its high temperature exhaust stream may be made the target for other missiles equipped with infrared responsive seeker heads or the target missile may be used to check out the response of guidance equipment and the like.

It is thus apparent that with minor changes, conventional high velocity aircraft rocket missiles can be employed as target missiles in accordance with the invention and requiring no costly remote control system.

Having described the invention, numerous variations thereof will become apparent to those skilled in the art as coming within the scope of the invention as defined in the appended claims.

I claim:
1. A rocket propelled high velocity target missile adapted to automatically execute a maneuver after launching including a rocket propelled body, aerodynamic control surfaces pivotally mounted on the body forward of the center of gravity, means for normally holding said control surfaces in alignment with the longitudinal axis of the missile body, explosive actuated power means for deflecting said control surfaces to cause the missile to change its course of flight, a source of electric current, a firing circuit connecting said source of electric current to said explosive actuated power means to fire the same and means for controlling said firing circuit including a pair of switches connected in series, one of said switches being operative to close only when the missile has exceeded a predetermined acceleration and the other switch being operative to close to complete the firing circuit only on the missile beginning to decelerate after the closure of the first named switch of said pair of switches.

2. In a rocket propelled target missile of the character described control vanes mounted on the missile body and adapted for pivotal movement, means for holding the control vanes normally inactive, power means for overcoming said holding means and for positively deflecting said control vanes in one direction to cause said missile to execute a maneuver, and means for controlling the energizing of said power means including a first control responsive to a predetermined acceleration and a second control responsive to a predetermined deceleration subsequent to operation of said first control and operative to energize said power means.

3. In a high velocity rocket propelled target missile of the character described in which the missile has a spin velocity about its longitudinal axis during flight, means for causing the missile to execute a random maneuver after reaching its maximum velocity comprising canard control vanes pivotally mounted on the missile body forward of the center of gravity, a shaft interconnecting said control vanes and providing for common pivotal movement, the axis of rotation of said shaft being aft of the center of pressure of said vanes, a stop limiting deflection of said vanes, shearable means for normally holding said vanes inactive and adapted to be sheared by application of a predetermined torque to said control vanes to permit said vanes to be deflected by aerodynamic reaction, and means for applying torque to said vanes to deflect the same comprising a plunger contacting at least one of said vanes, means containing an explosive for actuating said plunger, a firing circuit including an electric current source and a switch for firing the said explosive, said switch including means for maintaining the switch inoperative until the target missile has exceeded a predetermined acceleration and subsequently decelerated.

4. In a rocket propelled target missile, control vanes operative when deflected to cause said missile to execute a maneuver, means for normally holding said control vanes inoperative, explosive actuated means for acting on said holding means to render said vanes operative and including a source of electric current, a firing circuit and a control switch, said control switch including a first pair of contacts, a movable mass, a spring opposing movement of said mass in one direction to close said first pair of contacts until a predetermined acceleration has been exceeded, magnetic means for maintaining said first set of contacts closed after initial closure thereof, a second set of contacts in series with said first set of contacts said second set of contacts being closed by movement of said mass in the opposite direction due to a deceleration and closure of both of said sets of contacts completing said firing circuit.

5. In a rocket propelled target missile of the character described, control vanes on said missile pivotally supported for movement to effect a controlling action on the flight path of the missile, the pivotal axis of said vanes being aft of the centers of pressure thereof, stop means for limiting the deflection of said vanes, releasable means for holding said control vanes in an inoperative position, explosive squib actuated means for acting on said vanes to release said holding means and for deflecting said vanes to engage the stop means, a firing circuit including a source of electric current and a switch mechanism for firing the squib of the explosive squib actuated means, said switch mechanism including a movable mass movable in one direction due to missile acceleration and in the opposite direction due to missile deceleration, a pair of normally open series connected electric switches controlling said firing circuit one of said switches being closed by movement of said mass in said one direction and the other of said switches being closed by movement of said mass in the opposite direction and yielding means biasing said mass against movement in said one direction so that the associated switch will not be closed until the acceleration force acting on said mass exceeds a predetermined value and subsequent deceleration of said mass closing the other of said switches to complete the firing circuit.

References Cited in the file of this patent

UNITED STATES PATENTS

| | | |
|---|---|---|
| 2,737,356 | Varian et al. | Mar. 6, 1956 |
| 2,752,850 | Warner et al. | July 3, 1956 |
| 2,775,202 | Crockett | Dec. 25, 1956 |
| 2,791,653 | Haberland | May 7, 1957 |
| 2,802,204 | Kennelly et al. | Aug. 6, 1957 |
| 2,821,924 | Hansen et al. | Feb. 4, 1958 |